United States Patent
Steurer

(10) Patent No.: US 8,161,843 B2
(45) Date of Patent: Apr. 24, 2012

(54) DAMPING MOTOR AND CONTROL APPROACH FOR MITIGATING TORSIONAL BACKLASH, DAMPING CRITICAL GEARTRAIN SPEEDS, AND PROVIDING IMPROVED TORQUE CONTROL IN MECHANICAL GEARS

(75) Inventor: Michael Steurer, Crawfordville, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 855 days.

(21) Appl. No.: 12/229,144

(22) Filed: Aug. 20, 2008

(65) Prior Publication Data
US 2009/0049941 A1  Feb. 26, 2009

Related U.S. Application Data

(60) Provisional application No. 60/965,680, filed on Aug. 21, 2007.

(51) Int. Cl.
*F16H 37/06* (2006.01)

(52) U.S. Cl. ..................................... 74/661; 180/65.285

(58) Field of Classification Search .................... 74/661, 74/665 Q; 477/3; 180/65.245, 65.21, 65.285
See application file for complete search history.

(56) References Cited

U.S. PATENT DOCUMENTS

| 4,982,809 | A | * | 1/1991 | Nakamura et al. | 180/248 |
| 6,193,628 | B1 | * | 2/2001 | Hrovat et al. | 477/3 |
| 7,694,760 | B2 | * | 4/2010 | Leone et al. | 180/65.21 |
| 7,783,402 | B2 | * | 8/2010 | Sawada et al. | 701/38 |
| 2002/0061803 | A1 | * | 5/2002 | Aoki | 477/3 |
| 2007/0101965 | A1 | * | 5/2007 | Asahara et al. | 123/192.1 |

* cited by examiner

*Primary Examiner* — Justin Holmes
(74) *Attorney, Agent, or Firm* — J. Wiley Horton

(57) ABSTRACT

A torque damper motor connected to the output side of a mechanical gear system. The damper motor, along with its associated control system, mitigates backlash problems, reduced torsional resonance, and provides improved output torque control. In the preferred embodiment, the damper motor is powered by a power electronics-based variable speed drive. The damper motor can be significantly less powerful than the overall rating of the gear system (typically 5-10% of the overall rating) while still providing the enhanced performance.

20 Claims, 6 Drawing Sheets

DAMPING MOTOR AND CONTROL APPROACH FOR MITIGATING TORSIONAL BACKLASH, DAMPING CRITICAL GEARTRAIN SPEEDS, AND PROVIDING IMPROVED TORQUE CONTROL IN MECHANICAL GEARS

CROSS-REFERENCES TO RELATED APPLICATIONS

This is a non-provisional application claiming the benefit-pursuant to 37 C.F.R. §1.53(c) of an earlier-filed provisional application. The provisional application was filed on Aug. 21, 2007 and was assigned application serial number 60/965,680. The provisional application listed the same inventor.

STATEMENT REGARDING FEDERALLY SPONSORED RESEARCH OR DEVELOPMENT

This invention was developed using United States Department of Defense funding issued through a grant by the Office of Naval Research (Grant No. N0014-02-1-0623).

MICROFICHE APPENDIX

Not Applicable

BACKGROUND OF THE INVENTION

1. Field of the Invention

This invention relates to the field of mechanical gear systems. More specifically, the invention comprises a controlled damper motor placed between the gearbox output and the load.

2. Description of the Related Art

Many mechanical systems require the use of speed-changing gears. These are conventionally housed in a gearbox, which may include two or more sets of meshing gears. FIG. 1 shows one simple depiction of such a system. Prime mover 24 is intended to provide rotational mechanical energy to load 28. Unfortunately, the speeds at which the two devices operates are incompatible. The prime mover in this example is a steam turbine, which typically operates in excess of 10,000 RPM. The load is a synchronous electric generator, which operates at 360 RPM. The prime mover and the load may obviously not be directly connected.

The solution to this problem is the use of reduction gearbox 26. Reduction gearbox 26 houses several sets of meshing gears. Input shaft 30 is spinning at the speed of the turbine, but output shaft 32 is reduced to the rotational velocity needed for load 28.

While the reduction gearbox solves the speed compatibility issue, it introduces other problems. Those skilled in the art will know that every set of mating gears creates a backlash issue. The term backlash generally means the amount of rotational "slop" which exists between two mating gears. If an input shaft feeds torque into a single set of mating gears and an output shaft transmits that torque from the mating gears, it will be possible to turn the input shaft back and forth through some amount of rotation without turning the output shaft (and vice versa). This amount is referred to as backlash.

When the input and output shafts are loaded (such as by transmitting a fixed torque from a prime mover to a load) backlash is not typically a problem since the gear teeth remain engaged. However, when the load varies (or the system is unloaded or reversed), the gear teeth may become transiently disengaged and reengaged. This can produce resonant problems, as well as excessive gear tooth wear.

The problems associated with backlash have traditionally been addressed through gear design. Some of the prior art solutions include (1) designing specialized gear teeth which are better suited for dynamic loading conditions; (2) reducing tolerances between the interfacing gears; and (3) adding a fixed biasing torque which keeps the teeth engaged in one direction. Gear systems employing these solutions are often expensive to manufacture. The use of such specialized gears may reduce "clanging" and vibration. However, the gears still experience additional stress under dynamic loading and unloading conditions. Furthermore, tight gear interface tolerances often increase mechanical friction and present lubrication problems.

Backlash within a gear system also causes problems with resonance. A gear train possesses one or more critical speeds. When operated around these critical speeds, cyclic torsional vibration tends to increase. Vibration obviously reduces gear and bearing life. However, in many large systems, it is simply unsafe to operate the gear train at a critical speed. The system must then be designed to quickly pass through this speed (both accelerating and decelerating) in order to avoid damage.

An example of a rotating mechanical system is shown in FIG. 2. Motor 1 (34) and motor 2 (36) are connected to rotate in unison. These are collectively an input torque generating device. Motor 1 drive (44) and motor 2 drive (46) control motor 1 and motor 2, respectively. The two motors feed into low speed gear box 38. This component increases the rotational speed before feeding into high speed gearbox 40, which further increases the rotational speed. The output of high speed gearbox 40 is connected to load 28.

Such an arrangement can be used to evaluate the performance of the components involved. It is desirable to be able to control the input torque and the load torque. The motor drives control the input torque while load controller 42 controls the load torque. The reader may wish to consider exemplary specifications for the system of FIG. 2. Motor 1 and motor 2 are each 2.5 MW variable speed motors capable of producing a peak torque of 78,220 ft-lbf@225 RPM. Low speed gearbox 38 has an input range of 0-450 RPM and an output range of 0-3,600 RPM. High speed gearbox 40 has an input range of 0-3,600 RPM and an output range of 0-24,000 RPM. The load in this example spins in the range of 0-24,000 RPM and consumes a maximum of 5 MW.

Highly precise control of the input and output shaft torques can avoid the backlash and resonance problems discussed previously. However, those skilled in the art will realize that such control is often impossible. Returning to the example of FIG. 1, the reader will appreciate that one cannot rapidly adjust the torque produced by a prime mover such as a steam turbine. By the same token, one cannot rapidly adjust the torsional load created by a device such as a large electrical generator. Thus, it is desirable to introduce a new element which can provide rapid torque control to minimize backlash-related problems. The present invention proposes just such a device.

BRIEF SUMMARY OF THE INVENTION

The present invention comprises a torque damper motor connected to the output side of a mechanical gear system. The damper motor, along with its associated control system, mitigates backlash problems, reduced torsional resonance, and provides improved output torque control. In the preferred embodiment, the damper motor is powered by a power electronics-based variable speed drive. The damper motor can be significantly less powerful than the overall rating of the gear system (typically 5-10% of the overall rating) while still providing the enhanced performance.

REFERENCE NUMERALS IN THE DRAWINGS

| 18 | torque damper motor |
|---|---|
| 20 | load shaft |
| 24 | prime mover |
| 26 | reduction gearbox |
| 28 | load |
| 30 | input shaft |
| 32 | output shaft |
| 34 | motor 1 |
| 36 | motor 2 |
| 38 | low speed gearbox |
| 40 | high speed gearbox |
| 42 | load controller |
| 44 | motor 1 drive |
| 46 | motor 2 drive |
| 48 | armature winding |
| 50 | field winding |
| 52 | damper motor controller |
| 54 | homopolar rotor |
| 56 | load torque |
| 58 | gearbox output torque |
| 60 | damper motor torque |
| 62 | gearbox output shaft |

DETAILED DESCRIPTION OF THE INVENTION

Figure 1:
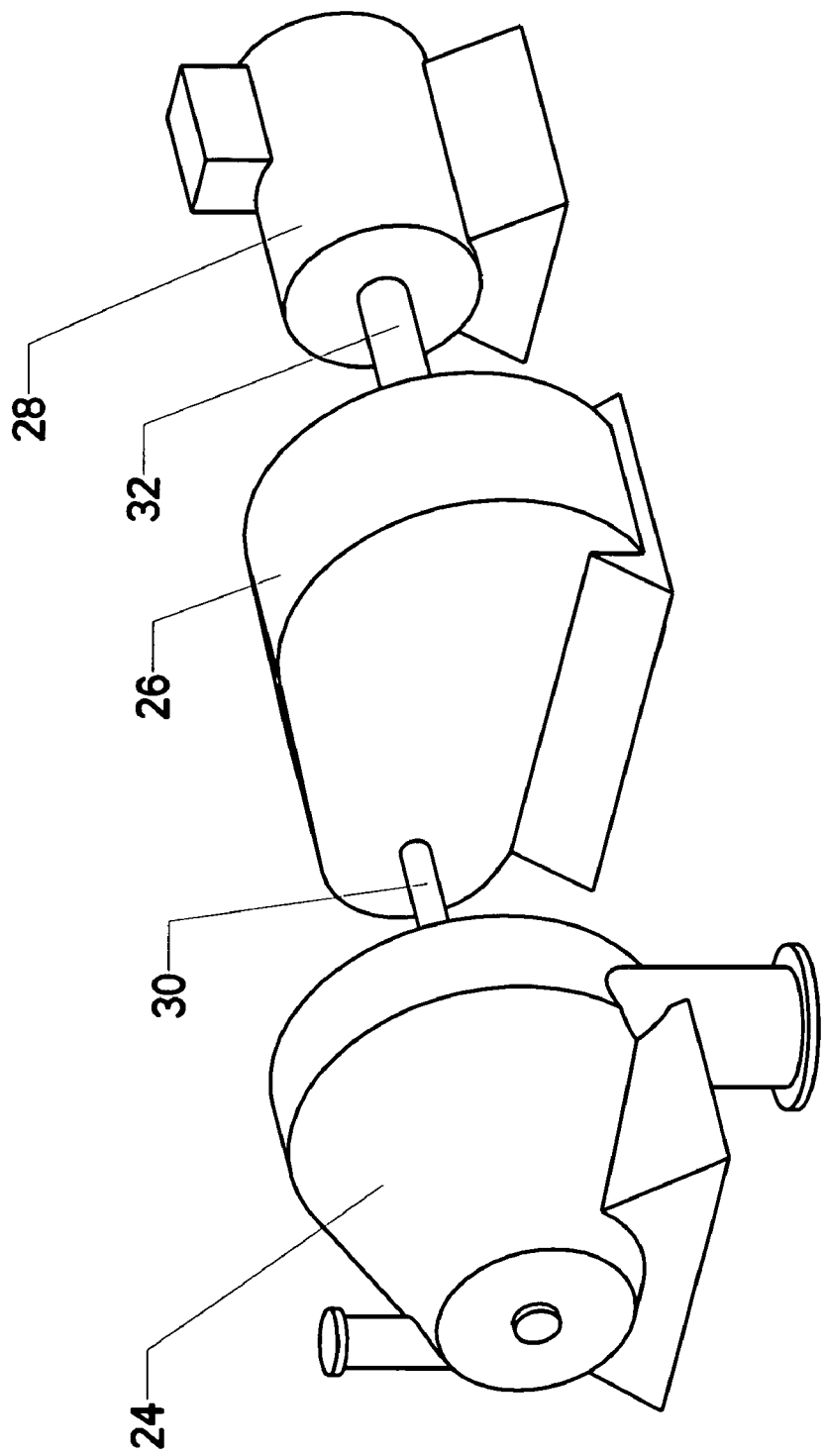
FIG. 1 is a perspective view, showing a simplified depiction of a prior art primer mover feeding a load through a reduction gearbox.
Figure 2:
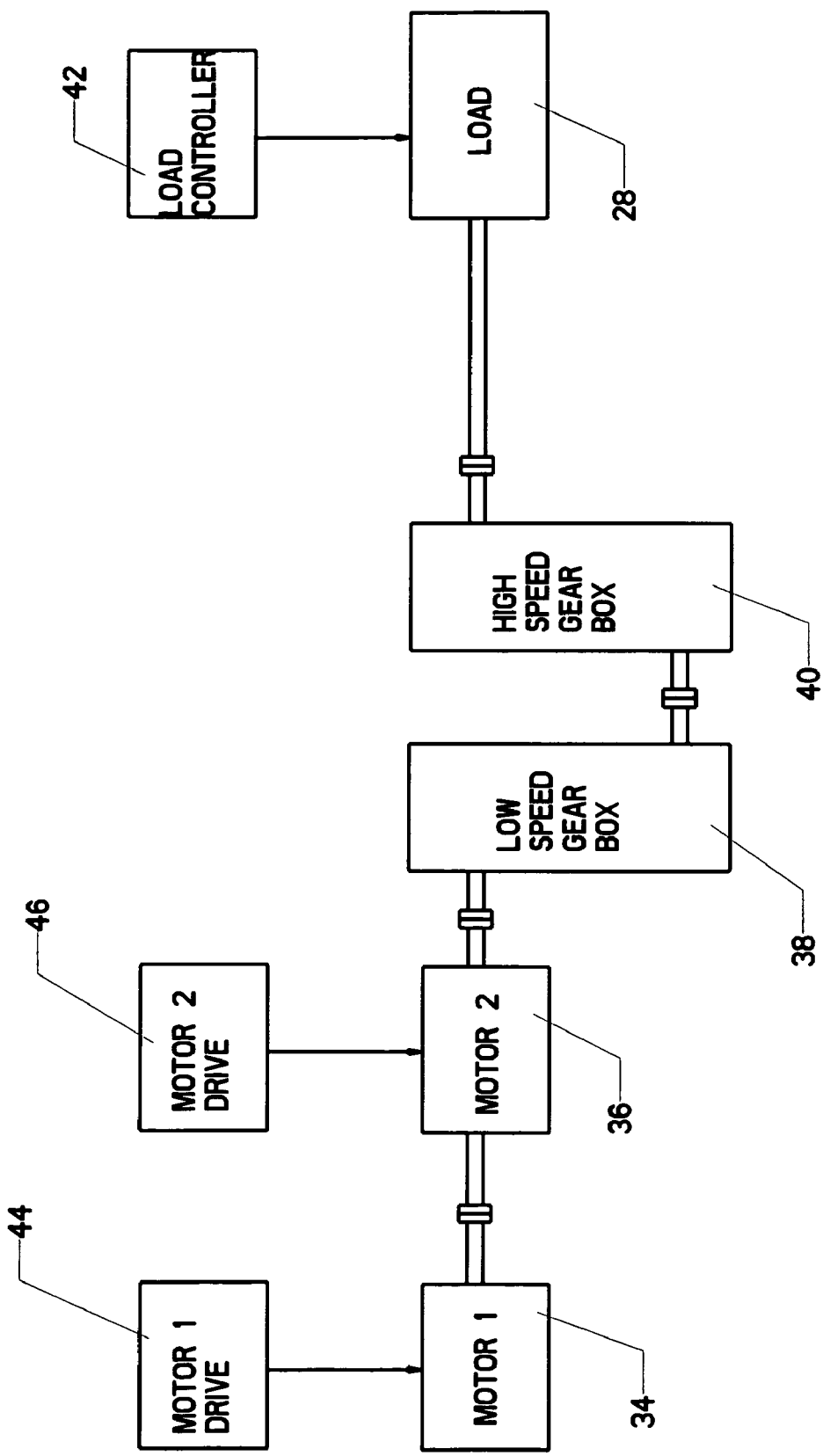
FIG. 2 is a schematic view, showing a prior art motor and gearbox arrangement with an attached load.
Figure 3:
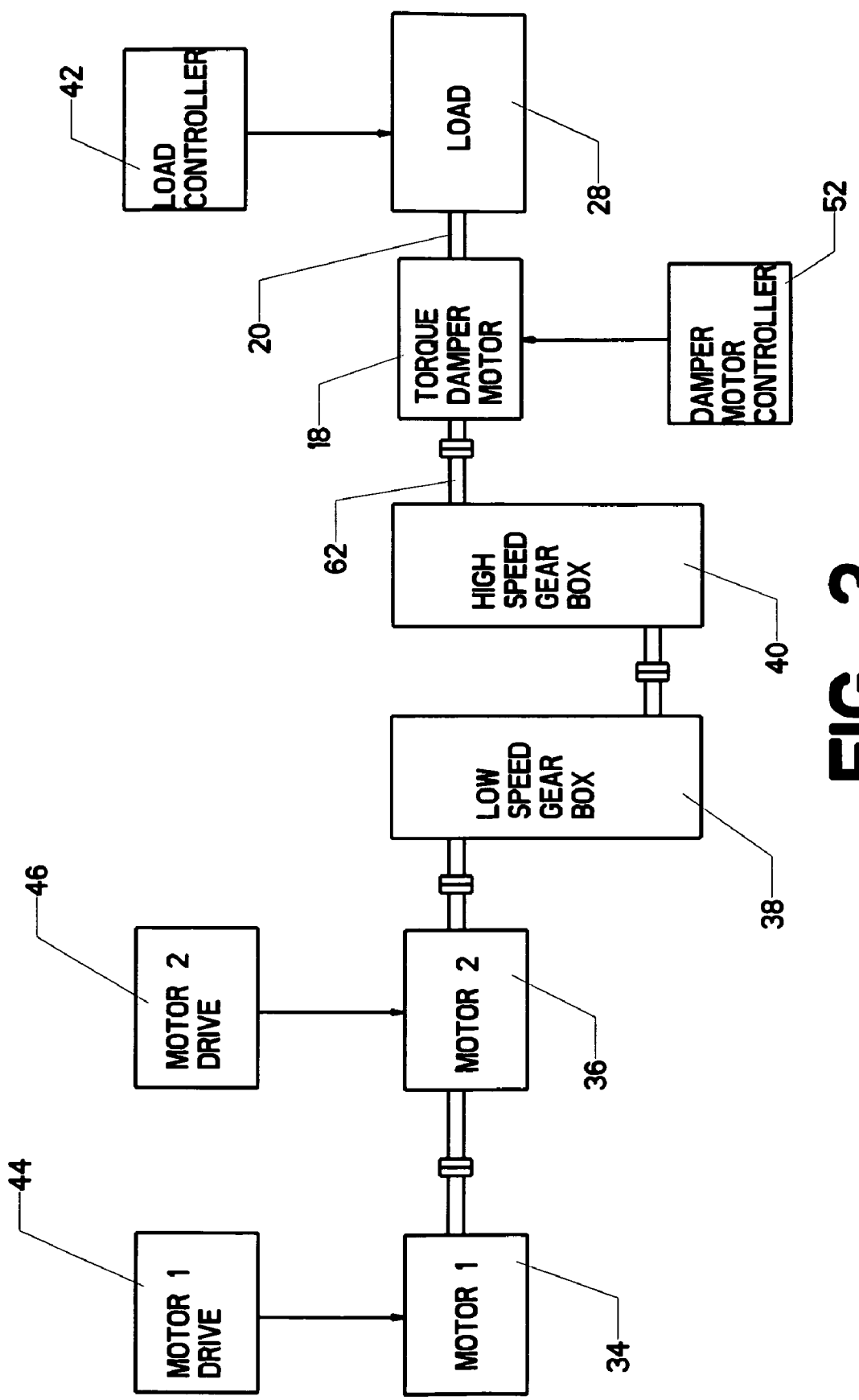
FIG. 3 is a schematic view detail view, showing a the addition of torque damper motor and associated controller.

The present invention proposes adding a controlled torque damper motor on the output side of a rotating mechanical system. FIG. 3 shows the addition of such a motor to the system of FIG. 2. In FIG. 3, the reader will observe that torque damper motor 18 has been added between high speed gearbox 40 and load 28. Gearbox output shaft 62 provides the rotating output from the two gearboxes. It is directly connected to load shaft 20, which powers load 28. Torque damper motor 18 rotates in unison with load shaft 20. It could be directly connected to the gearbox output shaft, or attached to the load shaft itself.

Rapid control of the torque damper motor is preferable, so damper motor controller 52 is provided. This provides rapid fluctuation in both the magnitude and direction of the torque produced by the torque damper motor. Those skilled in the art will know that such control can be provided by a variety of known methods. However, one good approach is to use a pulsed output from the damper motor controller to simulate a variable speed AC drive. Such a pulsed output may assume the form of a pulse-width-modulated drive, though other forms may be suitable in some applications.

Figure 4:
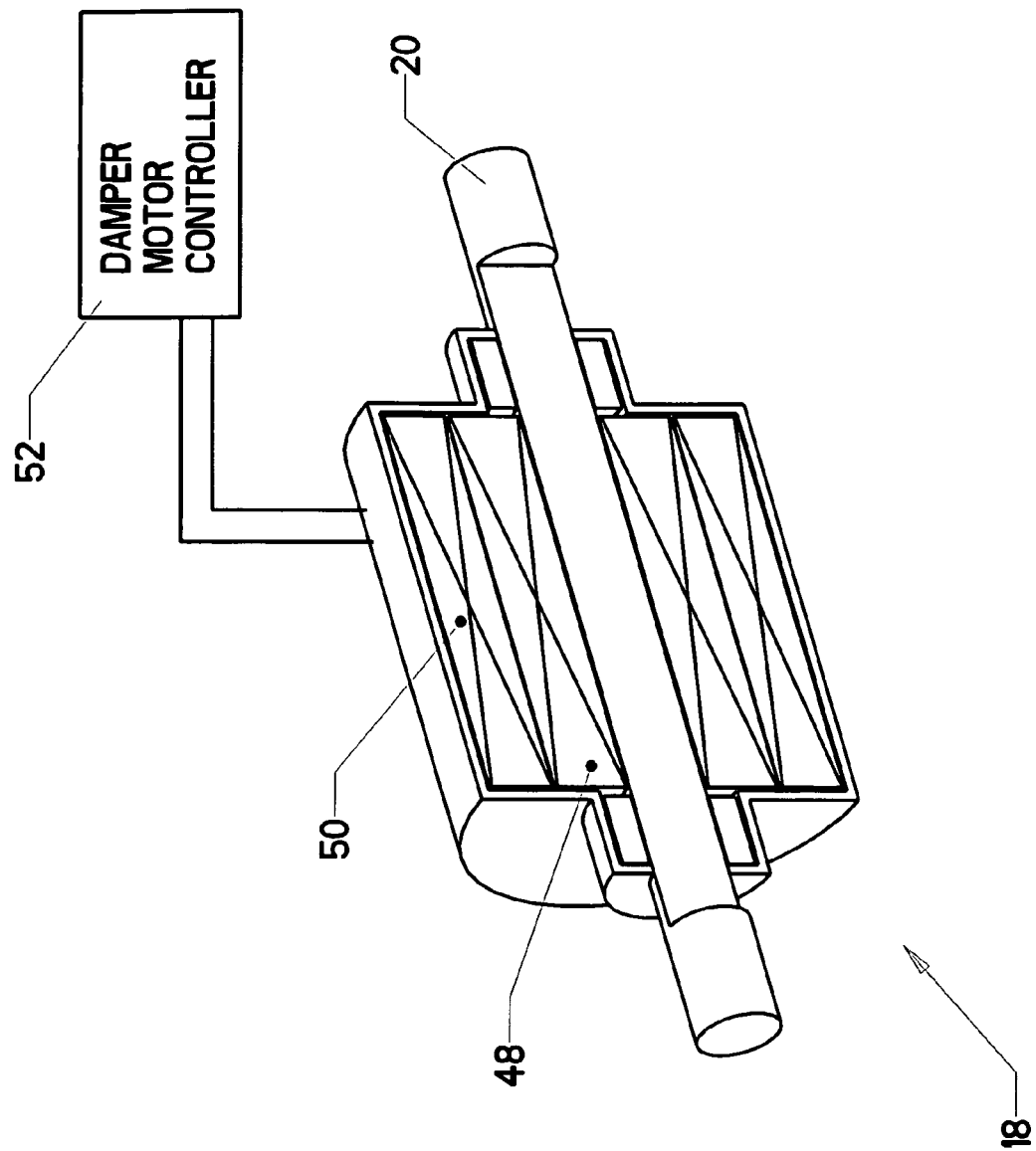
FIG. 4 is a sectioned perspective view, showing one example of a torque damping motor.
Figure 5:
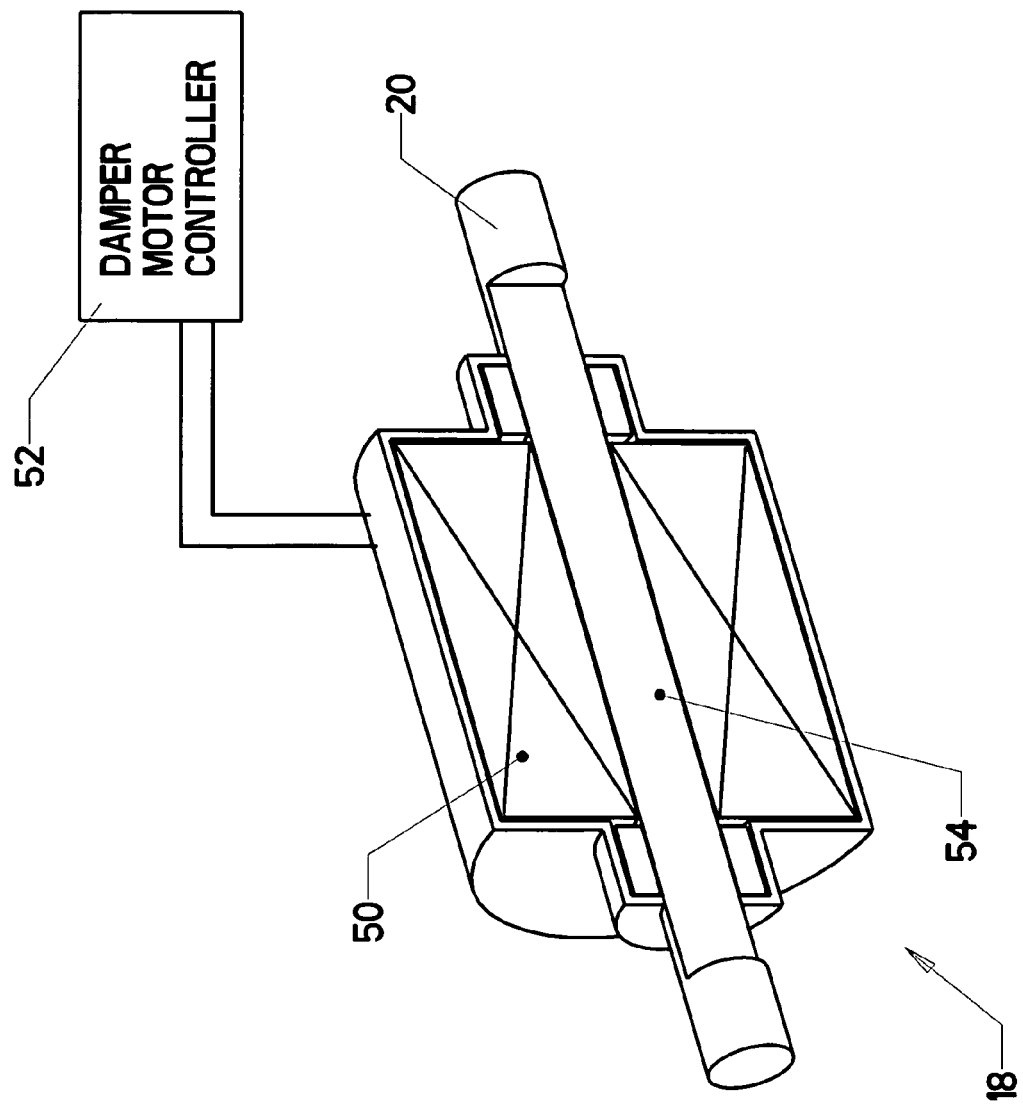
FIG. 5 is a sectioned perspective view, showing a second example of a torque damping motor.

Many different configurations could be used for the damper motor itself FIGS. 4 and 5 illustrate two examples among the many possibilities. In FIG. 4. armature winding 48 of torque damper motor 18 has been directly attached to load shaft 20. It spins with the load shaft and is selectively energized by a stationary field winding 50.

FIG. 5 shows an alternate configuration known as a "homopolar motor." If a ferromagnetic material is used for load shaft 20, then the portion lying within torque damper motor 18 can serve as a homopolar rotor 54. Field winding 50 selectively energizes the homopolar rotor to produce the desired direction and magnitude for the torque produced by the device.

Of course, there are many other types of motors which could be used for this application. While not all motor types are suitable for service as a torque damper motor, the reader should bear in mind that many more possibilities exist beyond the two examples of FIGS. 4 and 5.

Having now described the components of the invention, the reader may wish to know how these components interact to mitigate the problems discussed initially. The invention can be applied to any rotating system having a gear train. The system of FIG. 3 will be used as an example. Motor 1 and motor 2 create rotating input torque. The speed of the rotating input torque is significantly increased as it passes through the low speed gearbox and the high speed gearbox. The output of the high speed gearbox is then transferred from gearbox output shaft 62 to load shaft 20 and then to load 28. The torque demanded by load 28 is controlled by load controller 42. Assume as an example that the load is a compressor. The torsional load created by a compressor is controlled by adjusting the output flow rate and/or the output pressure. These values can be varied by load controller 42.

The need for the present invention is illustrated in the following scenario: The compressor (load 28) is set to a specific output pressure and flow rate. The system is then started and accelerated up to operating speed. Resonance may occur for a period when the operating speed is reached (the operating speed being the point where the input torque—less the losses incurred in the drive train—is equal to the torque required by the load). The gearboxes will load and unload as the resonance occurs ("freewheeling"), with resulting clanging and stress on the gears.

A more stark example occurs when the torque demanded by the load is suddenly reduced. If the pressure demanded from the compressor is suddenly reduced, the speed of motor 1 and motor 2 cannot be reduced instantaneously so an "overrun" occurs in which the angular momentum of the load actually drives the system in reverse (with the compressor driving the motors). This situation actually reverses the torque flow through the system (a negative torque). Those skilled in the art will know that going from a positive torque flow to a negative torque flow will cause the gears to go from a first engaged position, through a period of disengagement, and into a second engaged position (with the disengaged position being the backlash). This situation at best causes excessive wear and can even damage the gears.

Torque damper motor 18 can eliminate or at least mitigate these concerns. Damper motor controller 52 causes torque damper motor 18 to produce an appropriate magnitude and direction of torque to create a desired torque at gearbox output shaft 62. It compensates for variations in the torque demanded by load 28 so that the drive train does not experience damaging fluctuations.

Figure 6:
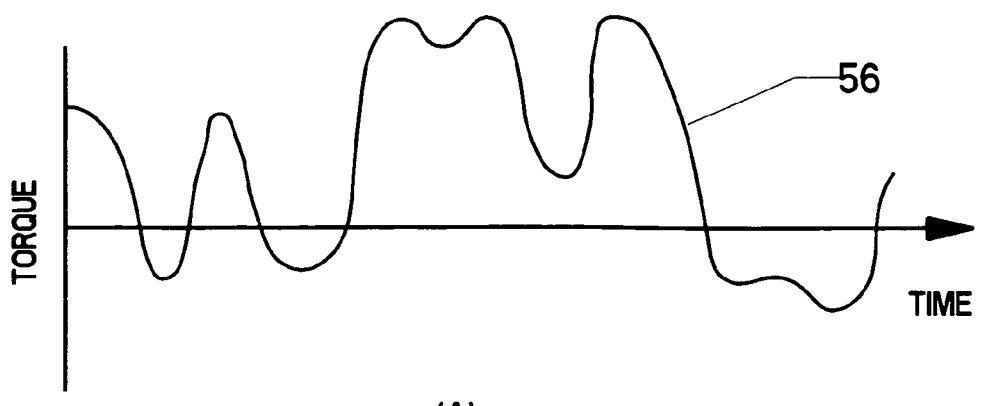
FIG. 6 is a graphical view, showing a plot of output shaft torque over time.
Figure 6:
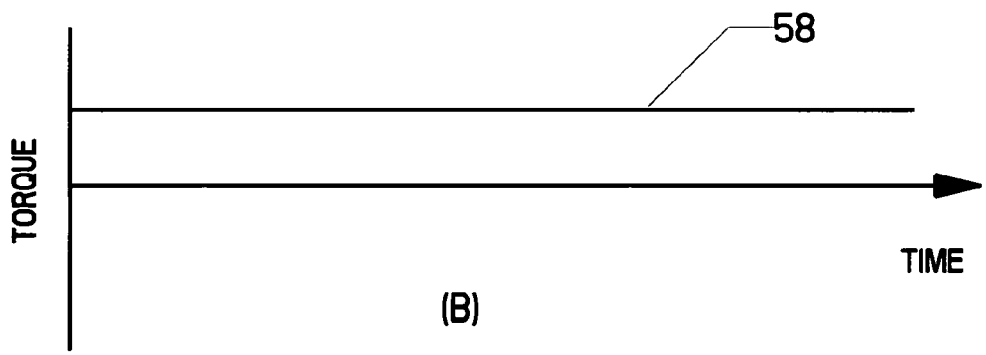
Figure 6:
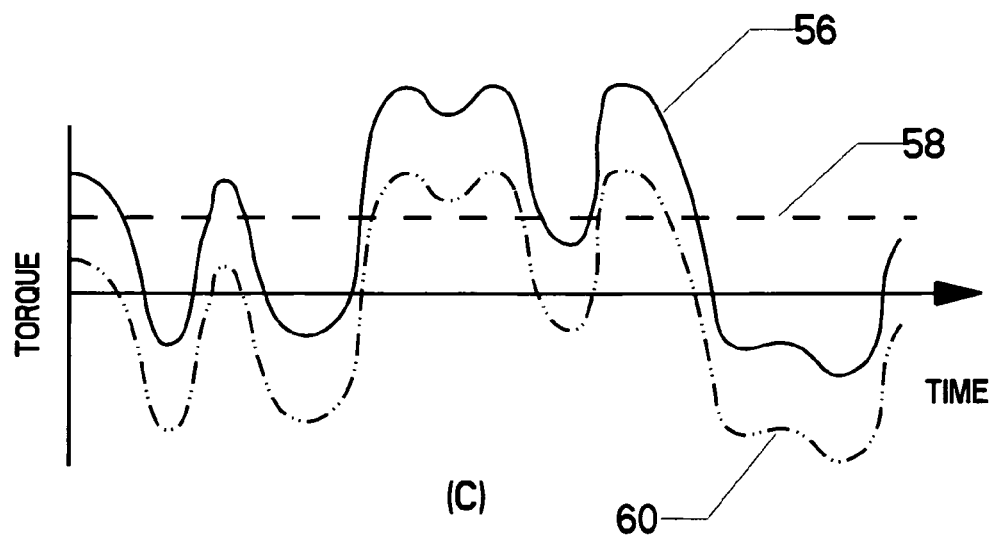

FIG. 6 graphically illustrates the function of the torque damper motor in one scenario. FIG. 6(A) shows a plot of load torque 56 over time. The reader will observe that the load torque fluctuates substantially and even becomes negative at some points (representing an overrun where the load actually feeds torque back into the system). This plot illustrates how a prior art drive train will experience backlash reversals in the gear teeth engagement and resulting "clanging."

The term "positive" and "negative" torque are somewhat arbitrary. As the system rotates in a first desired direction with torque flowing from the motors to the load, the torque is said to be "positive." All the gears in the drive train are positively engaged in a first engagement position. If the loading changes so that torque actually flows from the load back to the motors, then the gears will disengage, rotate through the backlash arcs, and reengage in a second engagement position. This torque would then be "negative." Changing from positive to negative torque—or from positive to zero torque—is generally undesirable.

The use of the term "torque damper motor" should also be explained. Those skilled in the art will quickly realize upon reviewing the drawing figures that the "torque damper motor" acts both as a motor and a generator. In those instances where it exerts a braking force on the rotating shaft, it is of course acting as a generator. The term "motor" in this context is intended to encompass both the motor and generator functions.

FIG. 6(B) represents a desired gearbox output torque for low-stress operation. The best scenario is a constant output torque on gearbox output shaft 62, which is represented as gearbox output torque 58.

FIG. 6(C) represents the operation of the system with the torque damper motor producing "biasing" torques. Load torque 56 (shown as a solid line) is the same as for FIG. 6(A). The damper motor controller then drives the torque produced by the torque damper motor to produce the desired result. The reader will observe that the difference between the load torque 56 (shown as a solid line) and the damper motor torque 60 (shown as a phantom line) equals the desired gearbox output torque 58 (shown as a dashed line). In other words, by appropriately driving the torque damper motor the input drive train (consisting of motor 1, motor 2, and the gearboxes) "sees" only a steady-state positive torque. No backlash is experienced, even though the load torque fluctuates and even reverses direction.

The torque damper motor can also be employed to dampen system resonance. Many gear trains experience resonance at certain speeds. Resonance can be simply a fluctuation of positive torque, a fluctuation between positive and zero torque, or a fluctuation between positive and negative torque. All of these are undesirable. The torque damper motor can introduce suitable biasing torque so that the gearbox output torque remains more constant. In some situations it will be possible to completely null the resonance, while in others it may only be possible to dampen the amplitude of the resonance.

The input torque and the load torque may be continually measured so that the damper motor controller can provide appropriate biasing torque to create smooth operation. In other instances, the input and load torques may be accurately predicted in advance. As an example, the start-up torque output of a steam turbine may be well known and mathematical functions can be written to predict its behavior. By the same token, the torque demands of a load such as an electrical generator may likewise be described using empirical or analytical functions. One or more of these function can then be mapped into the damper motor controller so that the controller "knows" what type of biasing torque to apply in a given scenario.

The torque damper motor can have a significantly lower torque output than the overall rating of the drive train, yet still provide effective performance enhancement. Even in those instances where the biasing torque needed exceeds its capability, it can still reduce the amplitude of the harmful effects.

The reader will thereby appreciate how the proposed invention eliminates or at least mitigates many of the problems inherent in rotating gear systems. Although the preceding description contains numerous examples, these are intended only to convey some of the embodiments of the invention and should not be viewed as limiting. As one example, the invention could be used with many types of torque creating devices other than steam turbines, electric motors, and compressors. Likewise, although a speed-increasing gear train was described in detail, the invention is equally applicable to speed-decreasing gear trains. The scope of the present invention should thus be fixed by the following claims rather than the specific examples given.

Having now described my invention, I claim:

1. A method for controlling output torque in a rotating mechanical system, comprising:
   a. providing an input torque generating device;
   b. providing a gearbox connected to said input torque generating device, said gearbox having a gearbox input shaft connected to said torque generating device and a gearbox output shaft;
   c. providing a load, with said load receiving toque from said gearbox output shaft through a load shaft;
   d. determining a load torque for said load;
   e. providing a torque damper motor which rotates in unison with said load shaft, with said torque damper motor being located between said gearbox output shaft and said load;
   f. defining a desired gearbox output torque;
   g. providing a damper motor controller which controls the torque created by said torque damper motor; and
   h. controlling said torque created by said torque damper motor so that the sum of said torque created by said torque damper motor and said load torque is approximately equal to said desired gearbox output torque.

2. A method for controlling output torque in a rotating mechanical system as recited in claim 1, wherein said torque damper motor is capable of rapidly fluctuating the torque it creates.

3. A method for controlling output torque in a rotating mechanical system as recited in claim 2, wherein said damper motor controller includes power electronics providing a pulsed output to said torque damper motor.

4. A method for controlling output torque in a rotating mechanical system as recited in claim 1, wherein said gearbox includes a plurality of sets of intermeshing gears.

5. A method for controlling output torque in a rotating mechanical system as recited in claim 4, wherein said plurality of sets of intermeshing gears are contained in at least two separate housings.

6. A method for controlling output torque in a rotating mechanical system as recited in claim 1, wherein said gearbox decreases the rotational speed of said input torque generating device.

7. A method for controlling output torque in a rotating mechanical system as recited in claim 1, wherein said gearbox increases the rotational speed of said input torque generating device.

8. A method for controlling output torque in a rotating mechanical system, comprising:
   a. providing an input torque generating device;
   b. determining an input torque produce by said input torque generating device;
   c. providing a gearbox connected to said input torque generating device, said gearbox having a gearbox input shaft connected to said torque generating device and a gearbox output shaft;
   d. providing a load, with said load receiving torque from said gearbox output shaft through a load shaft;
   e. determining a load torque for said load;
   f. providing a torque damper motor which rotates in unison with said load shaft, with said torque damper motor being located between said gearbox output shaft and said load;
   g. providing a damper motor controller which controls the torque created by said torque damper motor; and
   h. controlling said torque created by said torque damper motor so that said input torque generating device, said gearbox, and said load remain positively engaged with no backlash occurring.

9. A method for controlling output torque in a rotating mechanical system as recited in claim 8, wherein said torque damper motor is capable of rapidly fluctuating the torque it creates.

10. A method for controlling output torque in a rotating mechanical system as recited in claim 9, wherein said damper motor controller includes power electronics providing a pulsed output to said torque damper motor.

11. A method for controlling output torque in a rotating mechanical system as recited in claim 8, wherein said gearbox includes a plurality of sets of intermeshing gears.

12. A method for controlling output torque in a rotating mechanical system as recited in claim 11, wherein said plurality of sets of intermeshing gears are contained in at least two separate housings.

13. A method for controlling output torque in a rotating mechanical system as recited in claim 8, wherein said gearbox decreases the rotational speed of said torque generating device.

14. A method for controlling output torque in a rotating mechanical system as recited in claim 8, wherein said gearbox increases the rotational speed of said torque generating device.

15. A method for controlling output torque in a rotating mechanical system, comprising:
   a. providing an input torque generating device;
   b. providing a gearbox connected to said input torque generating device, said gearbox having a gearbox input shaft connected to said torque generating device and a gearbox output shaft;
   c. providing a load, with said load receiving toque from said gearbox output shaft through a load shaft;
   d. determining a load torque for said load;
   e. providing a torque damper motor which rotates in unison with said load shaft, with said torque damper motor being located between said gearbox output shaft and said load;
   f. providing a damper motor controller which controls the torque created by said torque damper motor; and
   g. controlling said torque created by said torque damper motor so that the sum of said torque created by said torque damper motor and said load torque is positive.

16. A method for controlling output torque in a rotating mechanical system as recited in claim 15, wherein said torque damper motor is capable of rapidly fluctuating the torque it creates.

17. A method for controlling output torque in a rotating mechanical system as recited in claim 16, wherein said damper motor controller includes power electronics providing a pulsed output to said torque damper motor.

18. A method for controlling output torque in a rotating mechanical system as recited in claim 15, wherein said gearbox includes a plurality of sets of intermeshing gears.

19. A method for controlling output torque in a rotating mechanical system as recited in claim 18, wherein said plurality of sets of intermeshing gears are contained in at least two separate housings.

20. A method for controlling output torque in a rotating mechanical system as recited in claim 15, wherein said gearbox decreases the rotational speed of said input torque generating device.

* * * * *